United States Patent
Ishizuka

[19]
[11] Patent Number: 5,917,182
[45] Date of Patent: *Jun. 29, 1999

[54] ROTATION DETECTOR AND CONTROLLER FOR DETECTING ROTATION INFORMATION USING A GRATING INTERFERENCE SYSTEM

[75] Inventor: Kou Ishizuka, Ohmiya, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/597,102

[22] Filed: Feb. 6, 1996

[30] Foreign Application Priority Data

Feb. 7, 1995 [JP] Japan .................. 7-019293

[51] Int. Cl.$^6$ .................................. G01B 11/14
[52] U.S. Cl. ........................ 250/237 G; 356/374
[58] Field of Search .................. 250/237 G, 231.14, 250/231.17, 231.18; 33/706, 707; 356/373, 374

[56] References Cited

U.S. PATENT DOCUMENTS

| | | | |
|---|---|---|---|
| 3,591,841 | 7/1971 | Heitmann | 250/231 R |
| 5,129,725 | 7/1992 | Ishizuka et al. | 250/237 G |
| 5,283,434 | 2/1994 | Ishizuka et al. | 250/237 G |
| 5,390,022 | 2/1995 | Ishizuka et al. | 356/356 |
| 5,448,358 | 9/1995 | Ishizuka et al. | 356/373 |
| 5,481,106 | 1/1996 | Nyui et al. | 250/237 G |
| 5,483,377 | 1/1996 | Kaneda et al. | 359/566 |
| 5,498,870 | 3/1996 | Ishizuka | 250/237 G |
| 5,663,794 | 9/1997 | Ishizuka | 250/237 G |

FOREIGN PATENT DOCUMENTS

| | | |
|---|---|---|
| 58-26002 | 5/1983 | Japan . |
| 58-45687 | 10/1983 | Japan . |

*Primary Examiner*—Edward P. Westin
*Assistant Examiner*—Kevin Pyo
*Attorney, Agent, or Firm*—Fitzpatrick, Cella, Harper & Scinto

[57] ABSTRACT

In an apparatus for detecting information on the rotation of an object using a grating interference system, the present invention provides a rotation detecting apparatus, which can be sufficiently miniaturized even when using another rotation information detecting section at the same time, and an apparatus for controlling the rotation using the same. The apparatus has a first detecting device for detecting by making the diffracted light from the diffraction grating interfere to detect rotation information of the object, a second detecting device for detecting the light from the predetermined data recording section to detect rotation information of the object, and a light beam illuminating device common to the first and second detecting means for illuminating the diffraction grating and the predetermined data recording section together.

24 Claims, 15 Drawing Sheets

ROTATION DETECTOR AND CONTROLLER FOR DETECTING ROTATION INFORMATION USING A GRATING INTERFERENCE SYSTEM

BACKGROUND OF THE INVENTION

1. Field of the Invention

The present invention relates to a rotation detector and rotation controller using this detector. In particular, the present invention is preferably applicable to a rotary encoder, which detects the rotation position of the disk, the amount and direction of the displacement of the rotation position, the rotation speed and acceleration and the like, by illuminating a radial diffraction grating and a code pattern on a disk attached to a relative rotation object with a light beam, and by detecting a modulated signal light obtained therefrom. The rotation detector and controller are applicable to a device, such as a motor with an encoder, which makes the object rotationally move by controlling the current and direction of the driving unit such as an AC motor and the like.

2. Related Background Art

Incremental rotary encoders have been used for high precision measurement of information on the rotation of the object, such as displacement, speed, acceleration and the like. Further, absolute rotary encoders, which detect the absolute rotation position of the rotor in the motor, have been used for brushless motors, such as AC motors. Therefore, combination rotary encoders which can obtain both signals are employed for controlling the rotation position of the object using AC motors and the like.

Conventional high precision incremental encoders detecting the displacement, as shown in Japanese Patent Publication Nos. 58-26002 and 58-45687 on the object, output incremental encoder signals by illuminating a monochrome light beam in which fine grating elements are recorded on the scale, by making periodic changes of the amount of the light with grating movement by means of the interference between at least two kinds of diffracted light among a plurality of diffracted light obtained therefrom, and by detecting a photoelectric element.

Further, conventional absolute rotary encoders, as disclosed in U.S. Pat. No. 3,591,841, have a structure which outputs the absolute rotation position of the disk, by forming a plurality of transmittable/non-transmittable or reflective/nonreflective patterns, such as grey code patterns, on the circuits, having different radii, on the rotation disk, so that only one combination of the codes exists in one rotation, and by detecting transmitted or reflected light at the specified position on each circuit. A typical absolute encoder for the motor outputs the position between the rotor and stator in the motor, by forming a plurality of transmittable/non-transmittable or reflective/nonreflective patterns, such as grey code patterns, on the circuits, having different radii, on the rotation disk, so that only M combinations of the codes exists corresponding to the structure of the motor, the number of the pole M, and by detecting the transmitted or reflected light at the specified position on each circuit.

In recent years, although a more compact encoder, for example, a disk having a diameter of 10 millimeters, has been required, it is difficult to miniaturize the combination encoder based on the different principles as described above. The miniaturization, in which two optical systems based on the different detection principles are placed together and each system is intended to miniaturize, has a limitation and some problems as follows: A plurality of light sources are separately required for the absolute encoder portion and the incremental encoder portion so that heat generation increases with the increased current consumption, and the structure becomes more complicated due to the increased number of parts required. In particular, since a device having an incremental encoder portion using a grating interference system requires a certain size so that the accuracy of the interference can be maintained, it is even more difficult to miniaturize this when another rotation detector is provided together.

SUMMARY OF THE INVENTION

It is an object of the present invention to provide a rotation detector sufficiently enabling miniaturization and a rotation control device, even if another rotation information detector is provided at the same time in the device for detecting rotation information using the grating interference system.

According to one embodiment of the present invention, an apparatus for detecting information on relative rotation of an object having a first diffraction grating and a predetermined data recording section includes a first detecting device for detecting by interfering diffracted light from the first diffraction grating to detect relative rotation information of said object, a second detecting device for detecting light from the predetermined data recording section from the object to detect rotation information regarding the object, and a light beam illuminating device for illuminating the first diffraction grating and the predetermined data recording section together.

According to another embodiment, the apparatus for detecting information on relative rotation of an object having a first diffraction grating and predetermined data recording section includes first and second photoelectric converting devices and an illuminating device. The first photoelectric converting device interfered and diffracted light from the first diffraction grating to obtain incremental rotation information regarding the object from an output from the first photoelectric converting device. The second photoelectric converting device detects information on transmittance/non-transmittance of the light by the predetermined data recording section to obtain incremental rotation information regarding the object other than the incremental rotation information from the output from said first photoelectric converting device. The illuminating means illuminates the diffraction grating and the predetermined data recording section together.

According to a still further embodiment of the present invention, the apparatus for detecting information described above, including first and second photoelectric converting devices and an illuminating device, is an apparatus in which the second photoelectric converting device detects information on reflection/non-reflection of the light by the predetermined data recording section.

According to a still further embodiment, the present invention is directed to an apparatus for controlling relative rotation of two objects. The apparatus includes a scale section, a detecting unit, and a control system. The scale section is provided on a first side of the two objects, and has a diffraction grating and a predetermined data recording section. The detecting unit is provided on a second side of the two objects. The detecting unit includes first and second photoelectric converting sections and an illuminating system as described above. The second photoelectric converting section may detect the transmittance/non-transmittance or the reflection/non-reflection of the light from the predetermined data recording section. The control system controls relative rotation of the two objects based on the outputs from the first and second photoelectric converting sections.

In still another embodiment, the present invention is directed to an apparatus for detecting information on relative rotation of an object having a diffraction grating and a predetermined data recording section. The apparatus includes first and second detecting devices, and a light guiding device. The first detecting device detects by making the diffracted light from the diffraction grating interfere to detect incremental rotation information regarding the object. The second detecting device detects light from the predetermined data recording section of the object to detect rotation information regarding the object. The light guiding device introduces light emitted from the diffraction grating and the predetermined data recording section together to the first and second detecting devices.

In still another embodiment, the present invention is directed to an apparatus for detecting information on relative rotation of an object having a diffraction grating and predetermined data recording section. The apparatus includes first and second photoelectric converting sections, and a common optical member. The first photoelectric converting section receives the interfered and diffracted light from the diffraction grating to obtain incremental rotation information regarding the object by an output from the first photoelectric converting section. The second photoelectric converting section detects transmittance/non-transmittance information by the predetermined data recording section to obtain rotation information regarding the object by an output from the second photoelectric converting section, other than the incremental rotation information. The common optical member introduces light emitted from the diffraction grating and the predetermined data recording section together to the first and second photoelectric converting sections.

Further objects, features and advantages of the present invention will become apparent from the following description of the preferred embodiments with reference to the attached drawings.

DETAILED DESCRIPTION OF THE PREFERRED EMBODIMENTS

Figure 1:
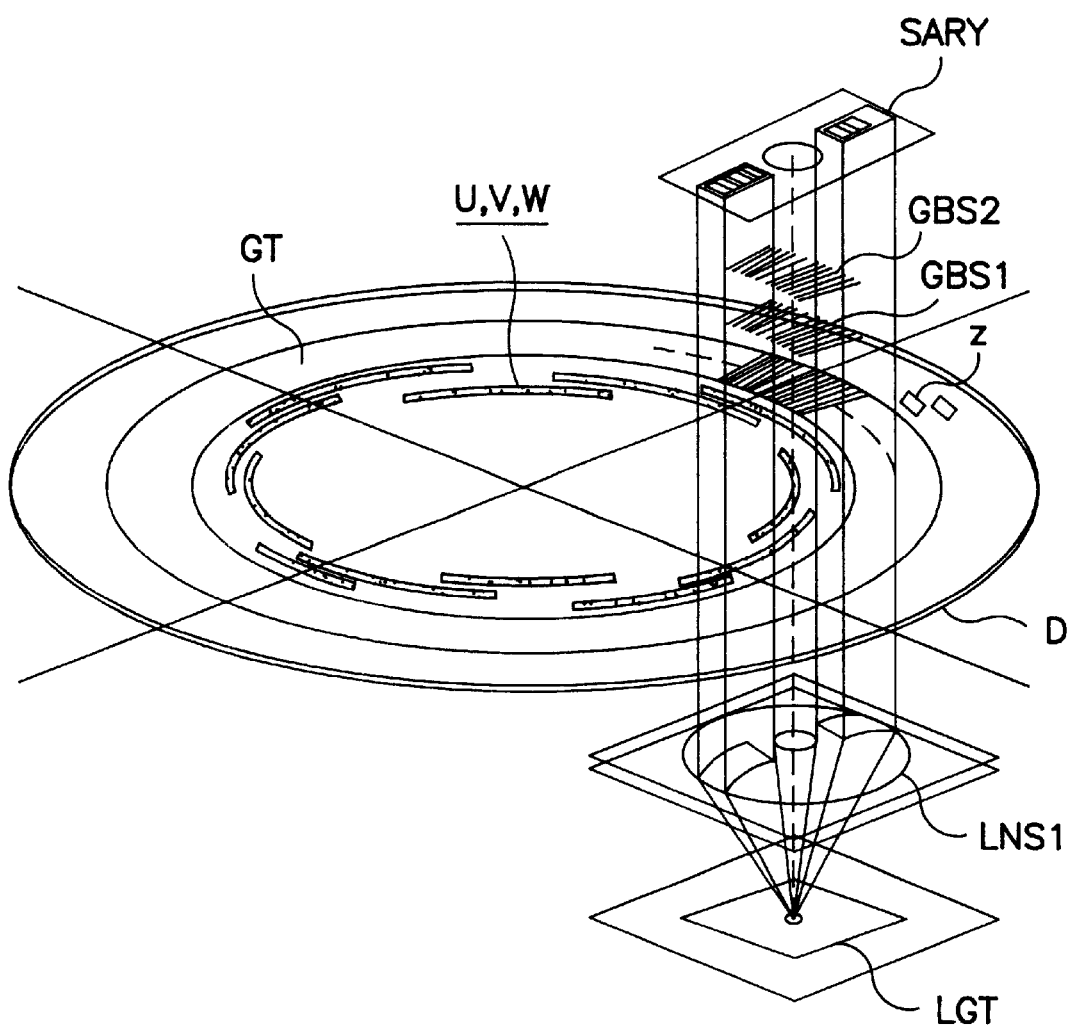
FIG. 1 is a schematic diagram illustrating an optical arrangement of a rotary encoder in a first embodiment of the present invention.
Figure 2:
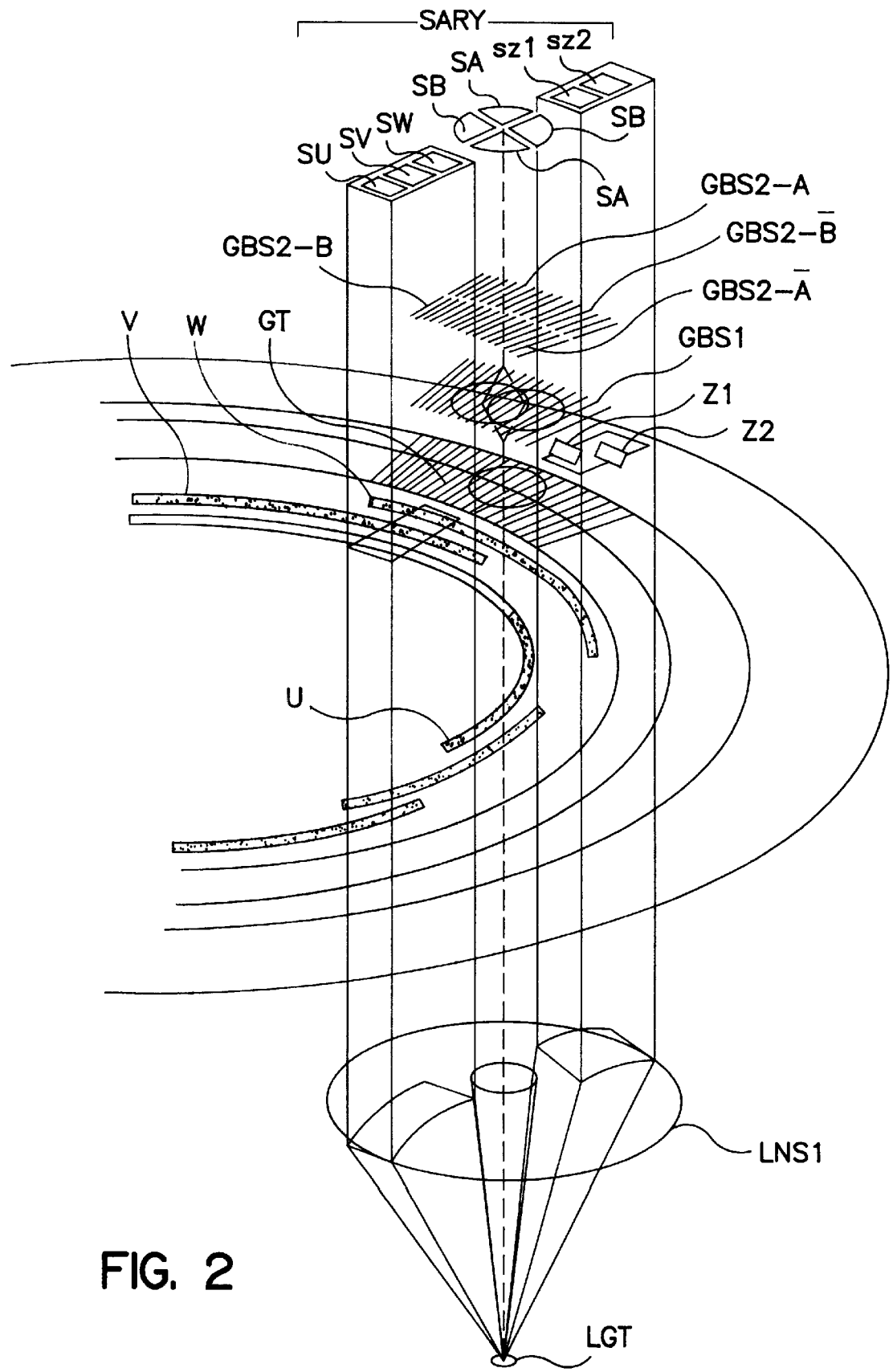
FIG. 2 is an enlarged diagram of the optical arrangement of the rotary encoder in the first embodiment of the present invention.
Figure 3:
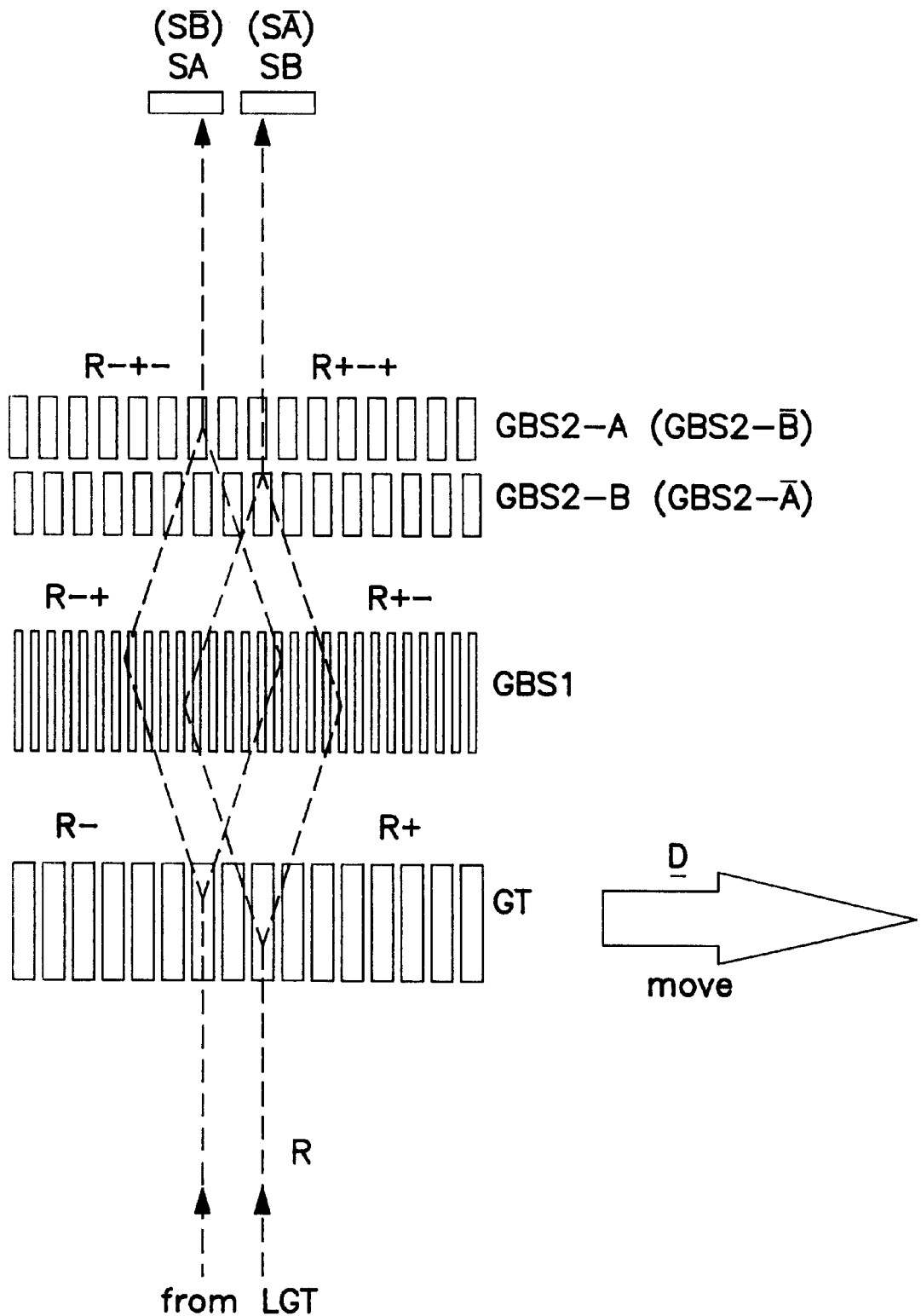
FIG. 3 is a schematic diagram illustrating light paths in the rotary encoder in the first embodiment of the present invention.
Figure 4:
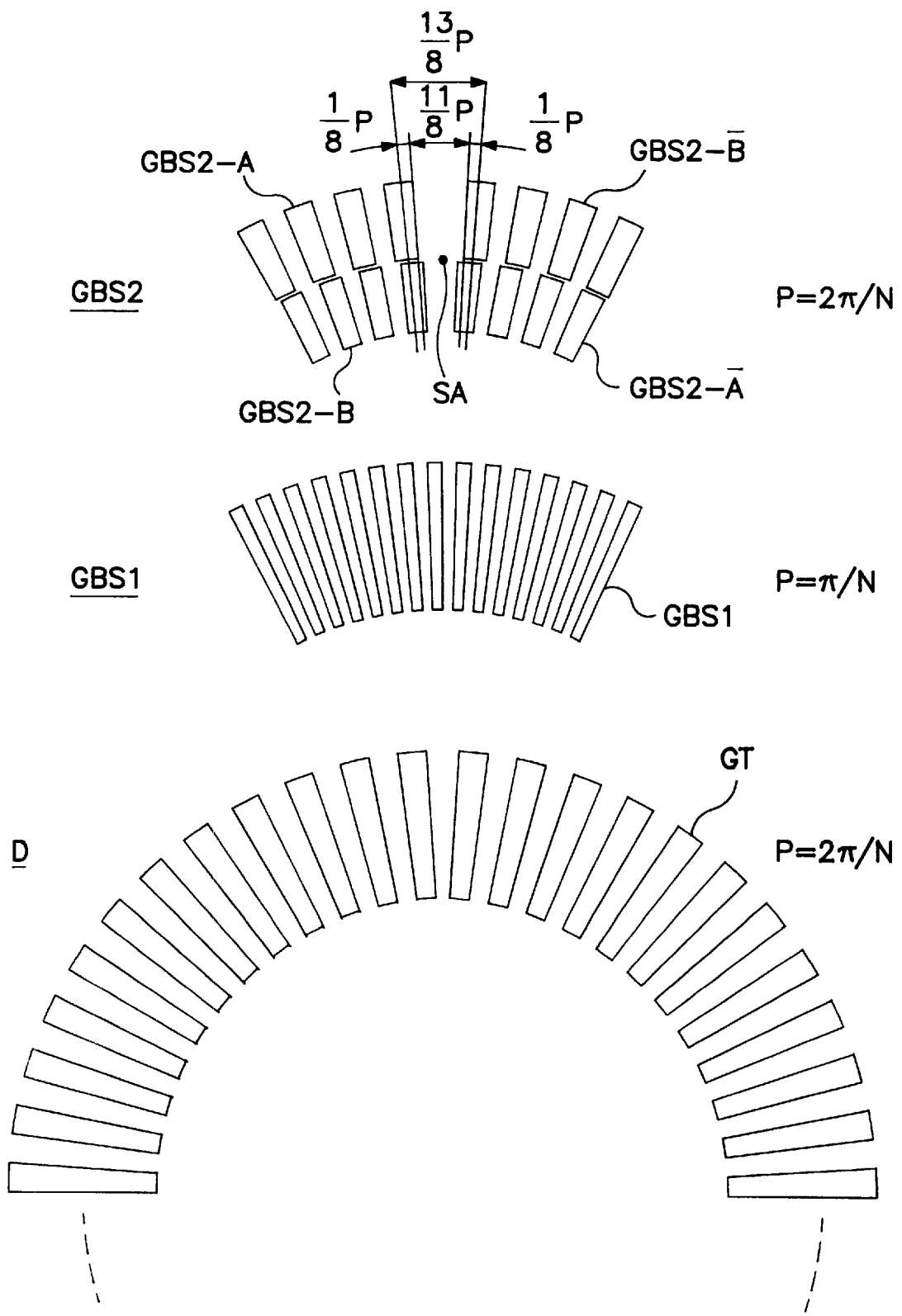
FIG. 4 is a diagram showing patterns of the diffraction gratings formed in the rotary encoder in the first embodiment of the present invention.

FIG. 1 is a schematic diagram illustrating an optical arrangement of a rotary encoder in the first embodiment of the present invention, FIG. 2 is an enlarged diagram of the optical arrangement, FIG. 3 is a schematic diagram illustrating light paths, and FIG. 4 is a diagram showing patterns of the diffraction gratings formed. In these figures, a disk D is provided on an object of which the relative rotation is detected, and other members, other than the disk D and each member on the disk D, are arranged by fixing each other and are isolated from the disk D.

A divergent light beam, emitted from a light source LGT such as LED, is converted to a parallel beam by a collimator lens LNS1, and the converted parallel beam illuminates the surface of the relatively rotating light transmittable disk D.

On the surface of the disk D, light transmittable, radial diffraction grating GT, formed over the entire circuit on the disk D, having a pattern as shown in FIG. 4, a home position code pattern Z formed by a light transmittable pattern at the home position, and light transmittable, absolute code patterns U, V, and W, provided so as to indicate angle information of each position over the entire circuit, as shown in FIGS. 1 and 2, are recorded along different circuits (tracks) respectively. The parallel light beam has a spread which can illuminate each partial region of the radial grating GT tracks, the home position code pattern Z track, and the absolute code pattern U, V, and W tracks together, as shown in FIG. 2, in which only the light beam incident on each sensor described below is depicted. A photoelectric element array SARY consists of incremental detecting portions SA, $\overline{SA}$, SB, and $\overline{SB}$, home position code detecting portions SZ1 and SZ2, and absolute code detecting portions SU, SV, and SW. The number of radial grating elements GT is taken as N on one circuit.

As described with reference to FIG. 3, two ± first order light beams, R+ and R−, are generated from the radial grating GT, illuminated with the above parallel light beam, wherein the grating pitch P=2π/N radian. These first order light beams R+ and R− are diffracted with the first diffraction grating GBS1 (grating pitch P=π/N radian), having a pattern as shown in FIG. 4, to convert to light beams R+− and R−+ by bending their light paths and to intersect at the points P and Q, respectively, in the space. The second diffraction grating GBS2, having a pattern as shown in FIG. 4, is placed at the intersection, and the light beams R+− and R−+ are diffracted by the second diffraction grating GBS2 (grating pitch P=2π/N radian) and are converted to the light beams R+−+ and R−+−, respectively, which emerge as light-or-dark signal light as the result of the mutual interference (Refer to FIG. 3).

The diffraction grating GBS2 is divided into four regions GBS2-A, GBS2-B, GBS2-A, and GBS2-B at the point P0 as the boundary as shown in FIG. 4, in which the phases of the grating arrays are shifted one-eighth pitch from each other. Each of the first and second diffraction gratings GBS1 and GBS2, and the radial grating GT have preferably a fine structure of lamellar grating which does not generate zero order diffraction light.

Since the light beam R illuminated on the disk D has a spread, the beam R reaches to the diffraction grating GBS1 in an almost superimposed state even after diffraction by the radial grating GT. For example, when the diameter of the light beam is 500 μm, the number of the radial grating elements is 2,500, the recording radius r on the disk D is 5,000 μm, and the wavelength λ of the LED is 0.86, the first diffraction angle θ becomes as follows:

$$\theta = \arcsin\{\lambda \cdot N/(2\pi r)\} = 3.92°$$

When the gap h between the radial grating GT and diffraction grating GBS1 is 500 μm, the distance between centers of diffraction beams on diffraction grating GBS1 becomes 68.5 μm.

The light beams R+−+ and R−+−, diffracted by the diffraction grating GBS2, emerge from the grating so that their light paths are superimposed on each other and their optical axes are parallel. Thus, the symmetry of all the light paths from the light source is preserved and the beams interfere each other. When the radial grating shifts one pitch by the rotation of the disk D, the phase of the wavefront of the diffraction light R+−+ shifts by +2π, and the phase of the wavefront of the diffraction light R−+− shifts by −2π. Thus, lightness-and-darkness of the interfered light changes twice in a sinusoidal manner per one pitch shift of the radial grating with the rotation of the disk. Moreover, since the diffraction grating GBS2 is divided into four regions at the point P0 as the boundary as described above, and the phases of the grating arrays are shifted by one-eighth pitch from each other, the interfered phase in each region, or the phase of lightness-and-darkness, changes twice in a sinusoidal manner due to the shift by one-fourth period.

The light, interfered in each region, enters the respective photoelectric element SA, SB, $\overline{SA}$, or $\overline{SB}$, and a sinusoidal analog signal current, having a period of 2N per rotation, is generated four times with the shift of each one-fourth period from each photoelectric element by turns. By using these four sinusoidal analog signals having phase shifts, the relative, incremental amount and direction of the rotation of the disk D are calculated in a signal processing circuit, not shown in the figures. Since the calculation itself is well-known, the explanation will be omitted.

On the other hand, in the track in which the home position code pattern Z is formed on the disk D, the portion not forming the pattern is non-transmittable so that incident parallel light beam cannot transmit this portion. When the parallel light beam illuminates the home position including the position of the home position code pattern Z during the rotation of the disk D, the parallel light beam enters the photoelectric elements SZ1 and SZ2 through the home position code pattern Z.

The home position code pattern consists of two light transmittable pattern portions, which are shifted in the rotational direction from each other, as shown in FIG. 2. The position in the radial direction of each pattern corresponds to the position of the photoelectric element SZ1 or SZ2, respectively. When the home position code pattern Z is illuminated with the parallel light beam, transmitted light enters the photoelectric elements SZ1 and SZ2 by the amount corresponding to the position of the pattern in the radial direction. When the home position code patterns Z1 and Z2 move in the illuminating region by the rotation of the disk D, the cross-section of the transmitted light, projected to the photoelectric elements SZ1 and SZ2, varies. Thus, the total amount of the light beam illuminating the photoelectric elements SZ1 and SZ2 varies, where the amount of the light received by each of the photoelectric elements SZ1 and SZ2 independently varies at the different timing due to the mutual positional difference of the patterns Z1 and Z2 in the rotational direction. Therefore, two bell-shaped analog signals, each having a peak at different times from each other, are generated from the photoelectric elements SZ1 and SZ2 by the rotation of the disk D. The home position signal may be generated, for example, as a pulse signal when both outputs from the photoelectric elements SZ1 and SZ2 are the same. Such a pulse signal may be generated from a signal processing circuit, not shown in the figures, which receives each output from the photoelectric elements SZ1 and SZ2. In such a way, the passage of the home position of the disk D is detected.

On the other hand, among of the above parallel light beam, illuminated on the track, in which the absolute code patterns U, V, and W exist, the transmitted light beam is continually projected on photoelectric elements SU, SV, and SW during the rotation of the disk D, at the time that the parallel light beam illuminates the absolute code patterns U, V, and W. Since a absolute code signal group is output from the photoelectric elements SU, SV, and SW in response to the current position in the rotation direction of the disk D, the absolute position can be identified by a signal processing circuit, not shown in the figures, from the combination of these binary signals. Since the methods for identifying the absolute position are well-known, a further explanation will be omitted.

As described above, the light beams which transmitted and were modulated by the disk illuminating region enter on the photoelectric element array SARY.

Both the diffraction grating GT for detecting the amounts of the incremental rotation by the grating interference/diffraction method, and the pattern for detecting other information on the rotation; i.e., the absolute position of the rotation and the home position, by detecting light transmittance/non-transmittance, not such a grating interference/diffraction method, are illuminated by the same optical illuminating system together, so a compact simplified structure can be achieved, and thus a more compact apparatus will be achieved. In particular, by the structure in which a parallel light beam illuminates both the diffraction grating for the grating interference method and the pattern for detecting the transmittance/non-transmittance of the light at the same time, the measurement or detection by the different method can be achieved using the same optical system.

Figure 5:
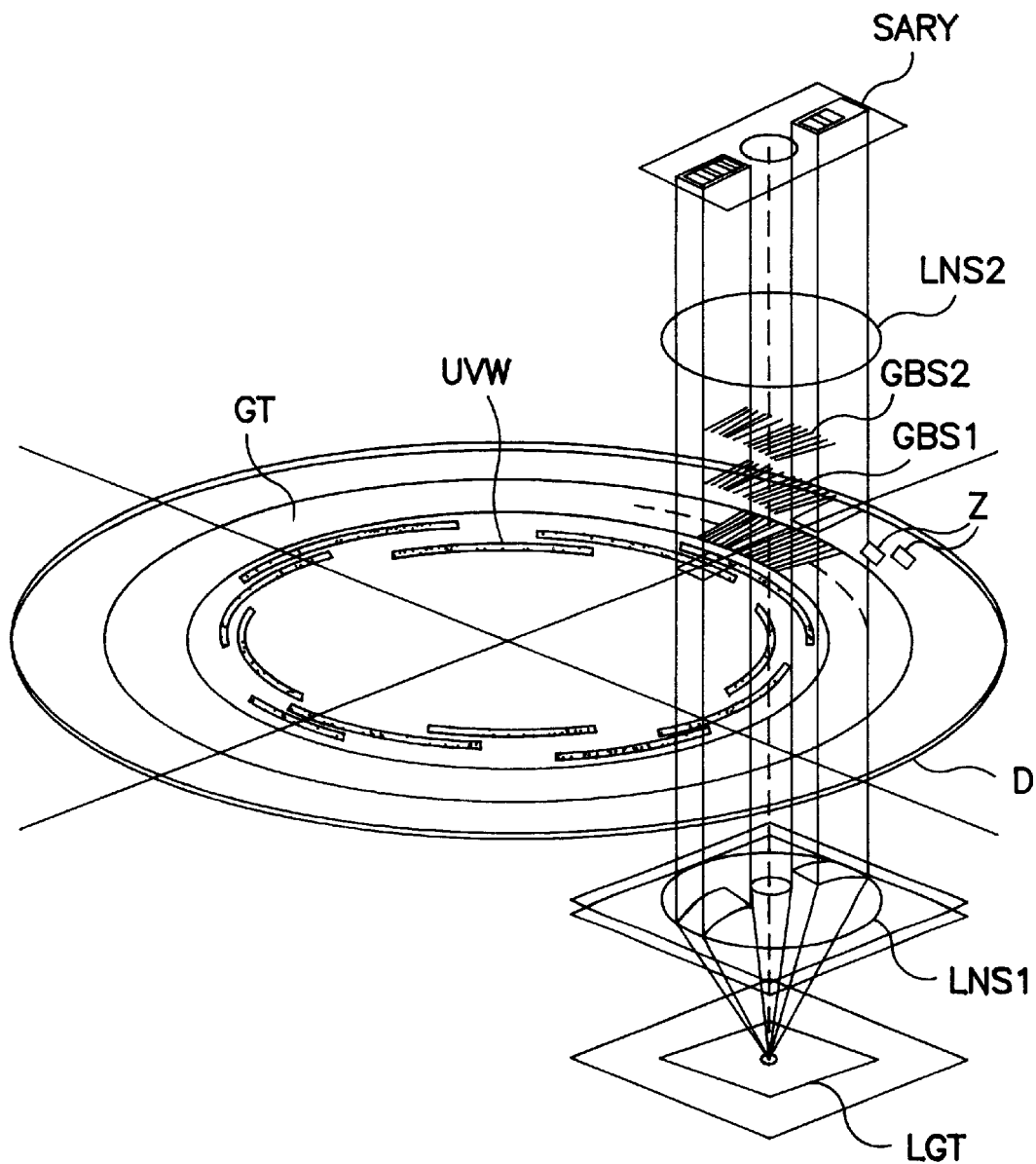
FIG. 5 is a schematic diagram illustrating an optical arrangement of a rotary encoder in a second embodiment of the present invention.

FIG. 5 is a schematic diagram illustrating an optical arrangement of a rotary encoder in the second embodiment of the present invention. A similar expression to FIG. 1 is used, and the explanation on the same members as the first embodiment will be omitted. In the following embodiments, the same notation is assigned to the same portion or member as the first embodiment.

In the second embodiment, an interference light beam for incremental measurement, and light beams from the absolute code pattern and home position code pattern are projected to the photoelectric element array SARY by using an image projecting lens LNS2. Therefore, the photoelectric element SARY is arranged in the opposite direction to the first embodiment. By such a structure in which the interference light for incremental measurement, the absolute code pattern and the home position code pattern are projected onto the photoelectric element SARY through the image projecting lens LNS2, the detection accuracy is further improved due to the improvement in the resolution at the edge of the absolute pattern and home position pattern. Moreover, since such a image projecting lens LNS2 is commonly used for all the projections of the interference light for the incremental measurement, the absolute code pattern and the home position code pattern, the structure can be miniaturized and simplified so as to enable compact apparatuses to be built.

Figure 6:
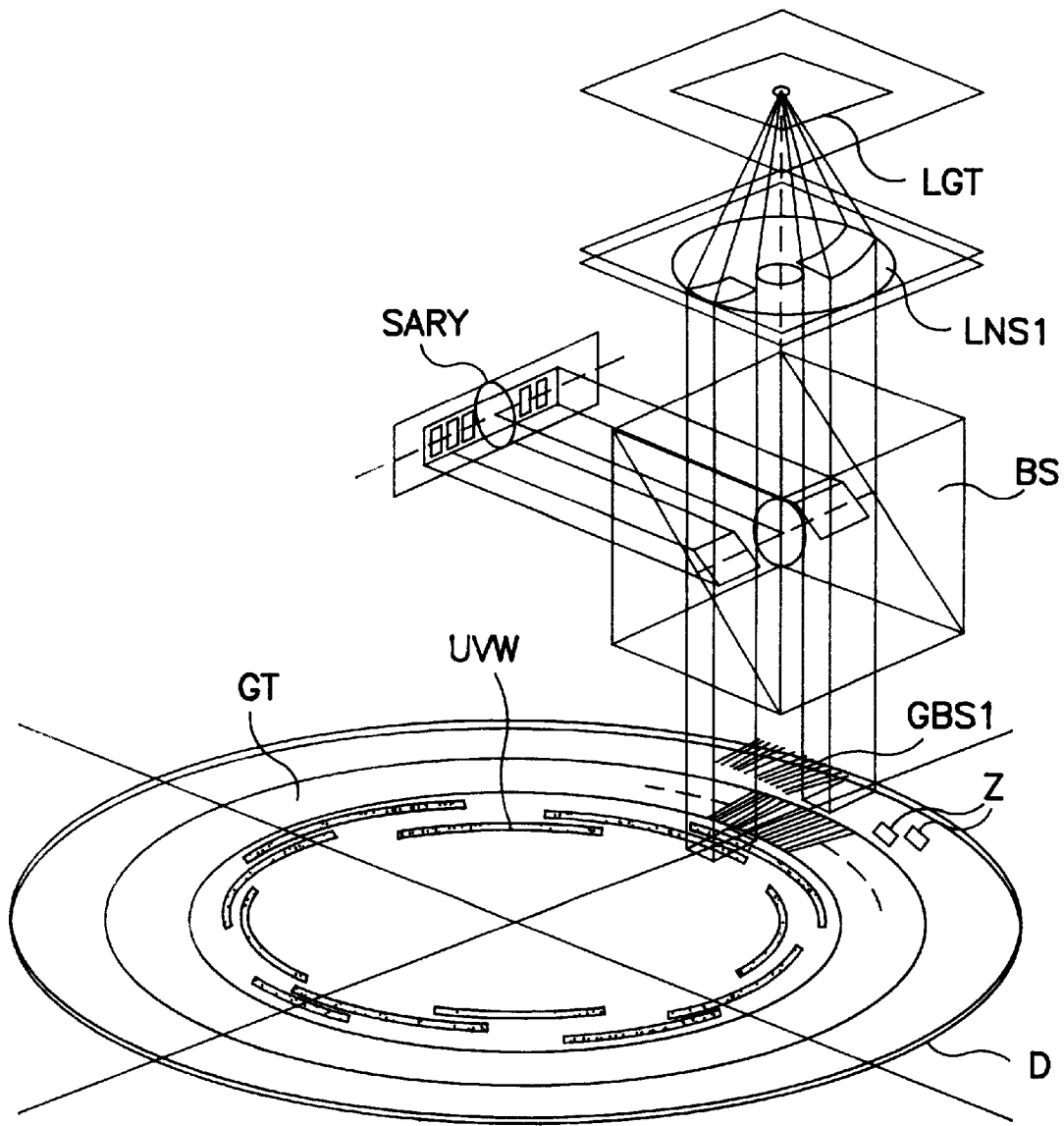
FIG. 6 is a schematic diagram illustrating an optical arrangement of a rotary encoder in a third embodiment of the present invention.
Figure 7:
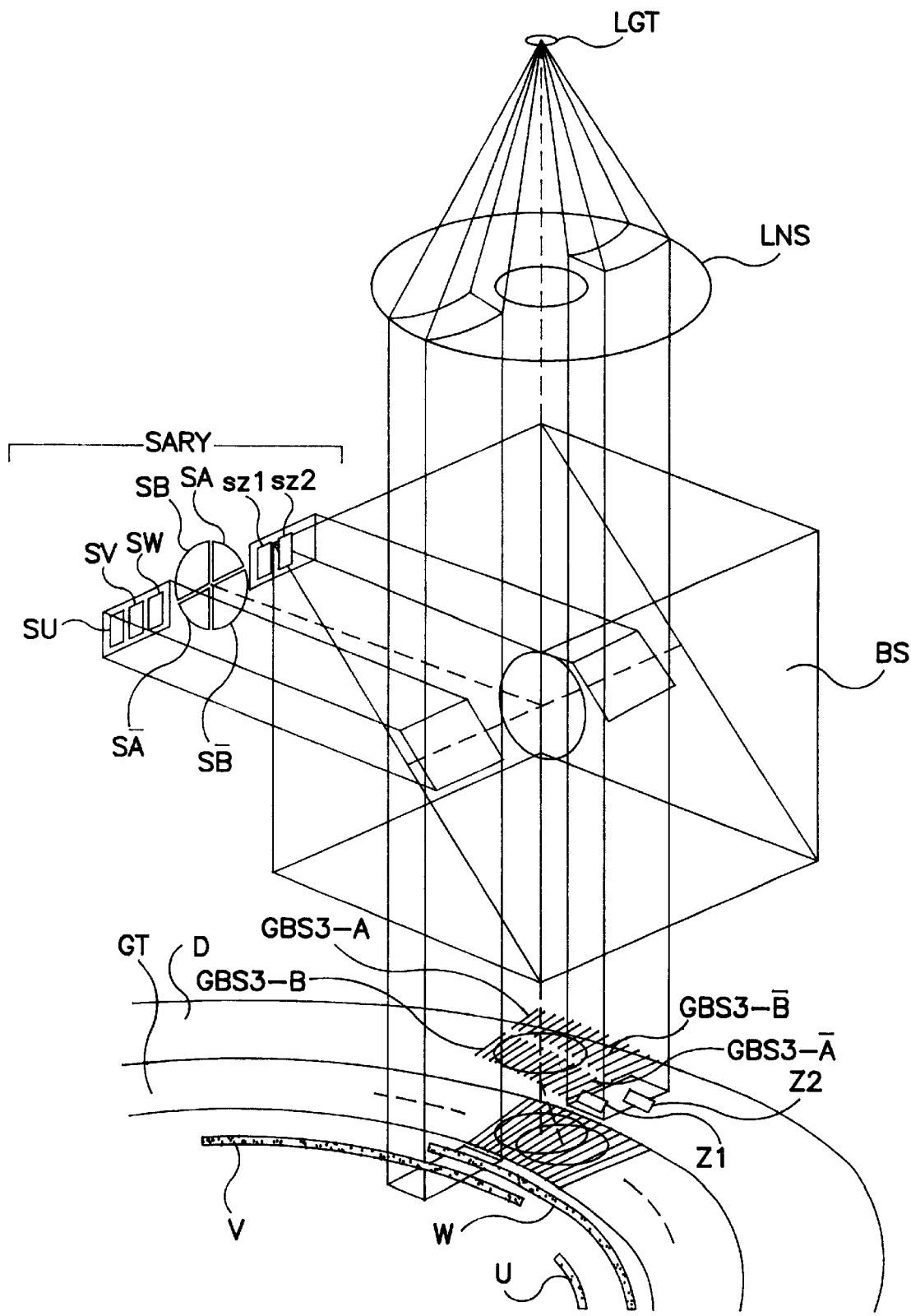
FIG. 7 is an enlarged diagram of the optical arrangement of the rotary encoder in the third embodiment of the present invention.
Figure 8:
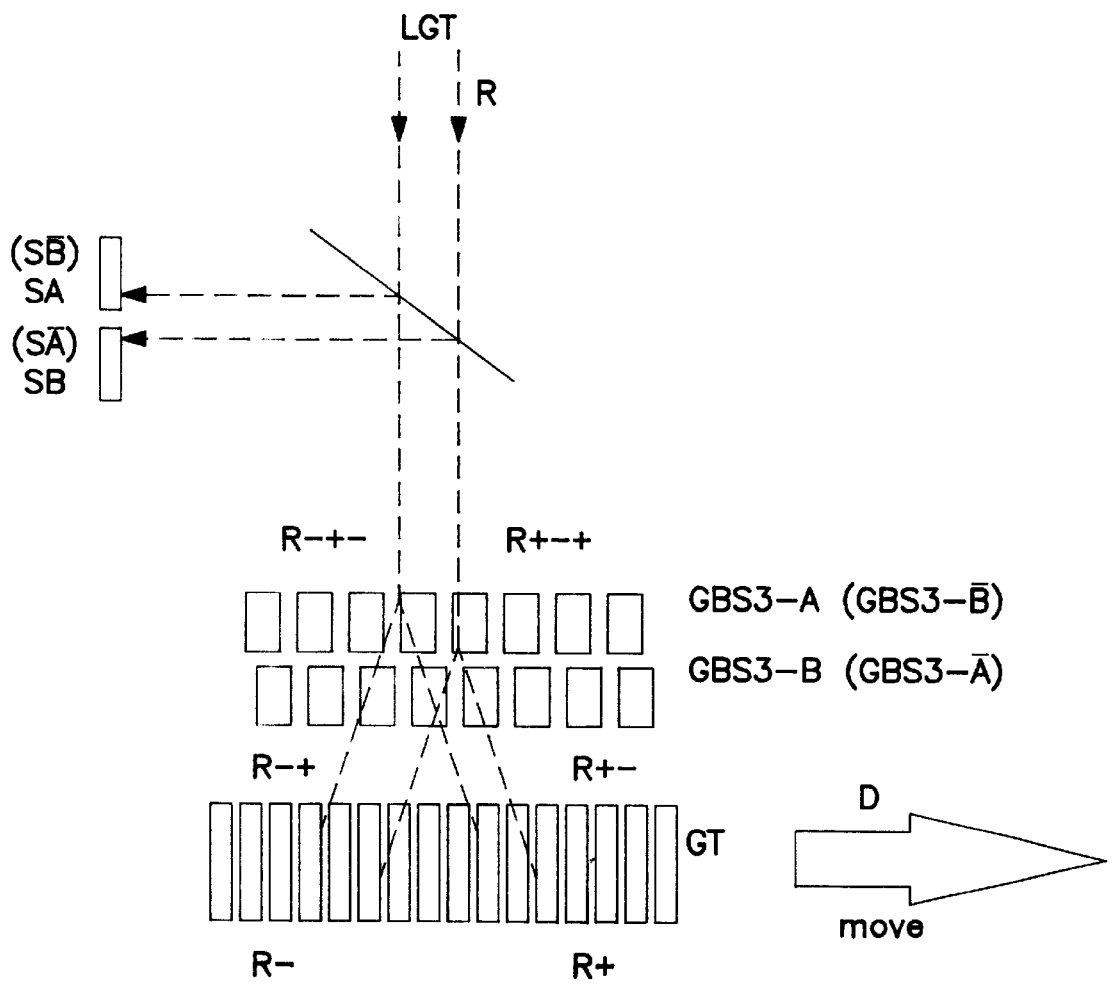
FIG. 8 is a schematic diagram illustrating light paths in the rotary encoder in the third embodiment of the present invention.
Figure 9:
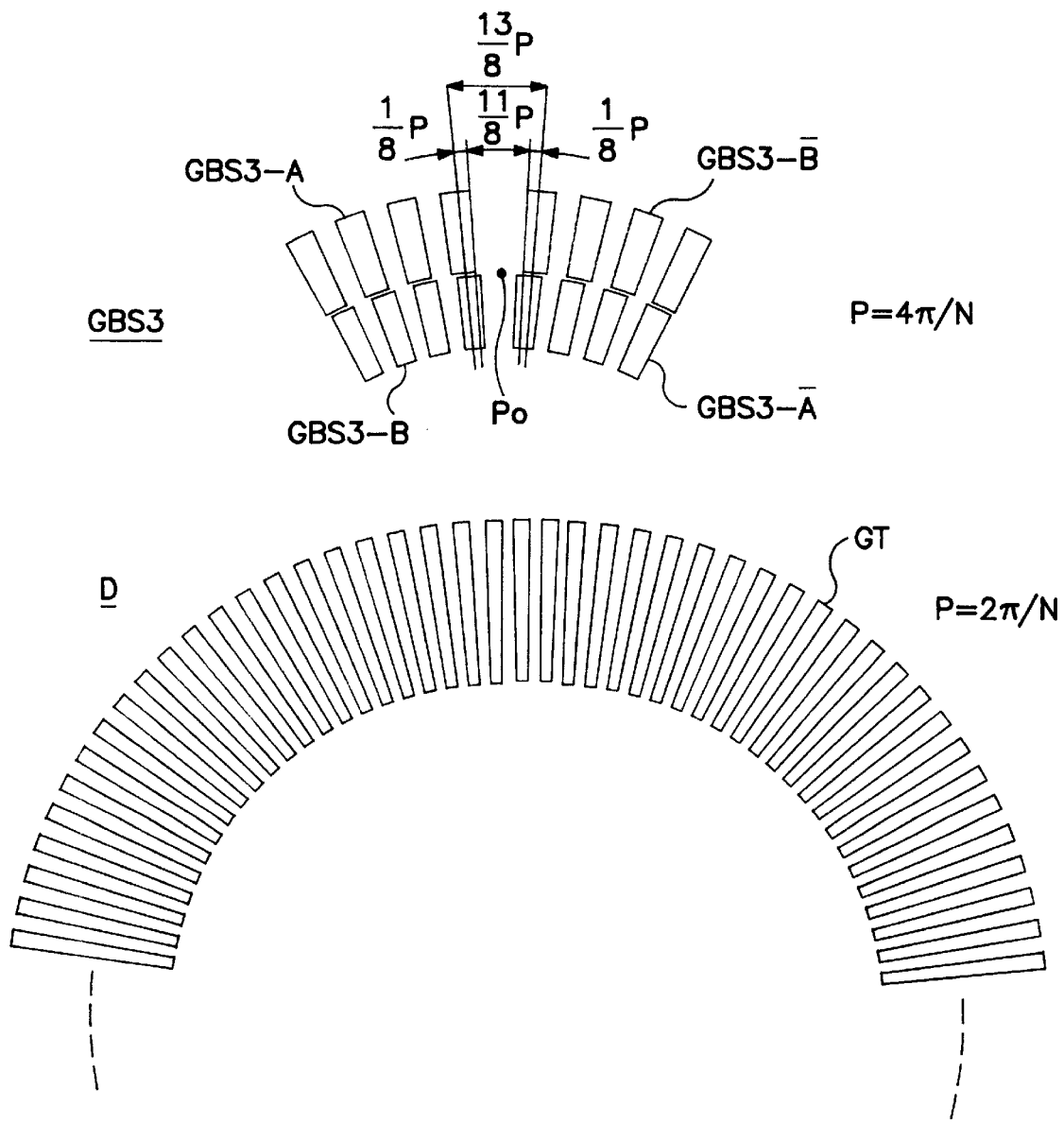
FIG. 9 is a diagram showing patterns of the diffraction gratings formed in the rotary encoder in the third embodiment of the present invention.

FIG. 6 is a schematic diagram illustrating an optical arrangement of a rotary encoder in the third embodiment of the present invention, FIG. 7 is an enlarged diagram of this optical arrangement, FIG. 8 is a schematic diagram illustrating light paths in the rotary encoder, and FIG. 9 is a diagram showing patterns of the diffraction gratings formed in this rotary encoder. The explanation will be omitted for the same members as in the first embodiment. The third embodiment differs from the first embodiment in that the reflected diffraction light due to the radial diffraction grating GT on the disk D is used in the third embodiment.

The light beams emitted from the light source LGT, such as an LED, are converted to the parallel light beams through the collimator lens LNS1, and are transmitted to a beam splitter BS. Part of the light beams are converted to two diffraction lights R+ and R− through a first diffraction grating GBS3 having a pattern (grating pitch P=4π/N radian) as shown in FIG. 9, and illuminate the relatively rotating disk D. The remaining light beams, not transmitted to the region of the diffraction grid GBS3, illuminate the relatively rotating disk D without modification.

On the disk D, a reflecting type of radial diffraction grating GT, a reflecting type of home position code pattern Z, and reflecting type of absolute code patterns U, V and W are recorded on different circuits or tracks. The parallel light beam has a spread sufficient to illuminate all the partial regions of the radial grating GT track, the home position code pattern Z track, and the absolute code pattern U, V and W tracks together, as shown in FIG. 7. Only part of the light beam incident on each sensor is drawn in FIG. 7.

Two ± first order reflected diffraction light beams R+− and R−+ formed by the radial grating (the grating pitch P=2π/N radian) are again diffracted by the first diffraction grating GBS3 (the grating pitch P=4π/N radian) to form light beams R+−+ and R−+−, which interfere each other due to the overlap of their optical paths and emit light and dark signal lights (refer to FIG. 8).

The first diffraction grating GBS3 and radial grating GT desirably have a fine structure of lamella grating not forming zero order diffraction light. Further, the diffraction grating GBS3 is divided into four regions, i.e. GBS-A, GBS-B, GBS-A, and GBS-B at the boundary of the point P0, and the phase of each grating is shifted by one-eighth pitch from each other.

Since the light beam R illuminated on the disk D has a spread, it is reflected almost in the overlapped state on the radial grating GT after the reflection by the reflection grating GBS3, and is again introduced to the diffraction grating. For example, when the radius of the illuminating light beam is 500 μm, the number of the radial gratings N is 2,500, the radius r of the recording on the disk D is 5,000 μm, and the wavelength λ of LED is 0.86 μm, the incident angle of the disk illuminating light θ becomes as follows:

$$\theta = \arcsin\{\lambda \cdot N/(4\pi r)\} = 1.96°$$

Letting the gap h, between the radial grating GT and diffraction grating GBS3, =500 μm, the distance between centers of diffraction beams on diffraction grating GBS3 is 34.2 μm.

The light beams R+−+ and R−+−, re-diffracted by the diffraction grating GBS3, are emitted so that light paths of the optical axes overlap with each other and become parallel to each other. Since all paths from the light source can be kept symmetrical, the light beams interfere with each other. On the interference, when the radial grating moves by one pitch with the disk rotation, the phases of the wavefronts of the diffraction light beams R−+− shift by +2π and −2π, respectively. Thus, the lightness-and-darkness of the interfered light sinusoidally changes twice by the one-pitch shift of the radial grating due to disk rotation.

Moreover, since the diffraction grating GBS3 is divided into four regions at the boundary of the point P0 as described above, and each grating is arranged so that each phase is shifted by one-eighth, the interfered phase in each region shifts by one-fourth, and lightness-and-darkness sinusoidally change twice.

Since the interfered light beams from these regions are reflected with the beam splitter BS and are illuminating respective photoelectric elements SA, SB, $\overline{SA}$ and $\overline{SB}$, four sinusoidal analog signals, each having a period of 2N per rotation, are generated from the photoelectric elements SA, SB, $\overline{SA}$ and $\overline{SB}$, with shifting by one-fourth period from each other. By using such four phase-shifted sinusoidal analog signals, the amount and direction of the relative incremental rotation are calculated in a signal processing circuit not shown in the figures. Since the calculation is well-known, the explanation will be omitted here.

On the other hand, since the track, in which the home position code pattern Z is formed on the disk D, is provided so as not to form the reflected light at the portion not having the home position code pattern Z, the reflected light does not form even if the aforementioned parallel light beam enters. When the disk D reaches near the home position during each rotation and the parallel light beam enters the portion of the home position code pattern Z, the light beam enters the photoelectric elements SZ1 and SZ2 after reflection by this pattern.

The home position code patterns Z1 and Z2 consist of two light reflecting patterns, as shown in FIG. 7, which are shifted in the rotational direction from each other, both are provided to correspond with the positions of the photoelectric elements SZ1 and SZ2 in the radial direction. When the home position code pattern Z is illuminated with the aforementioned parallel beam, the reflected light enters the photoelectric elements SZ1 and SZ2 through the beam splitter BS in response to the rotational positions of patterns Z1 and Z2. When the home position code pattern moves in the illuminating region by the rotation of the disk D, the cross-section of the light reflected at the home position code patterns Z1 and Z2 and projected to the photoelectric elements SZ1 and SZ2. Thus the total amount of the light incident upon photoelectric elements SZ1 and SZ2 varies. The amount of received light of each of the photoelectric elements SZ1 and SZ2 independently varies at a different timing due to the mutual positional difference in the rotation direction. Thus, two bell-shaped analog signal currents, each having a different peak, is generated from the photoelectric elements by the rotation of the disk D. The home position signal may be, for example, a pulse signal generated when the outputs of the photoelectric elements SZ1 and SZ2 are the same. The passage of the home position of the disk D can be detected in such a way.

On the other hand, the aforementioned parallel light beam illuminating the track in which the absolute code patterns U, V and W exist, is continually projected on either of the photoelectric elements SU, SV and SW through the beam splitter BS as the reflected light, only when the light beam illuminates either transmittable portion among the absolute code patterns U, V and W. An absolute code signal group is output from the photoelectric elements SU, SV and SW in response to the rotational position of the disk D, and the absolute position is identified by a signal processing circuit not shown in the figures. As the method for identifying the absolute position is well-known, the explanation will be omitted here.

As described above, even when using the optical reflection type of diffraction grating and code patterns, the diffraction grating GT for detecting the incremental amount of rotation by the grating diffraction method and the patterns for detecting other information, such as absolute rotational position and home position, on the rotation by light-and-blackness of the light are illuminated together using the single illuminating optical system. Thus, the apparatus can be further miniaturized by the compact, simple structure.

Figure 10:
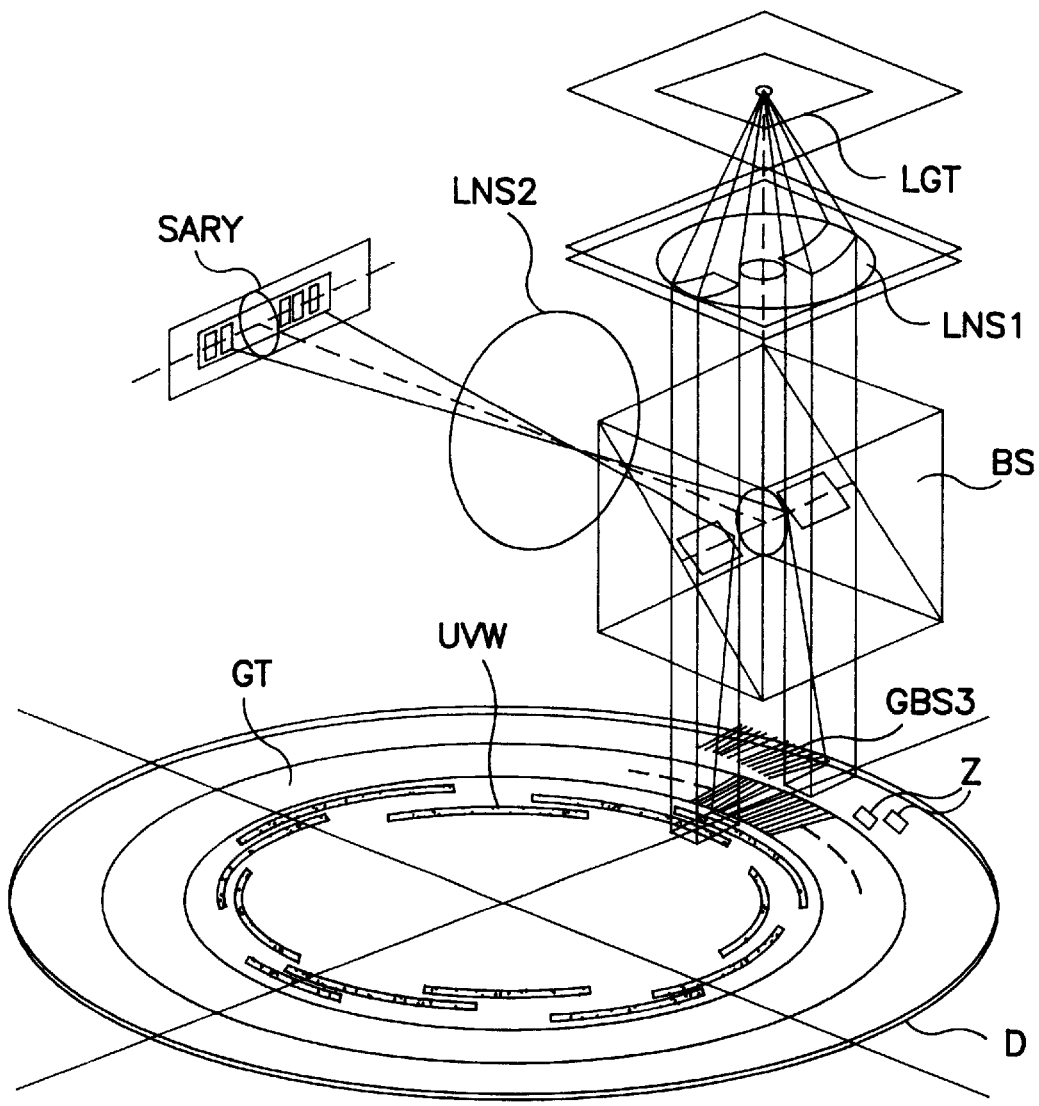
FIG. 10 is a schematic diagram illustrating an optical arrangement of a rotary encoder in a fourth embodiment of the present invention.

FIG. 10 is a schematic diagram illustrating an optical arrangement of a rotary encoder in the fourth embodiment of the present invention, in a way similar to FIG. 6. On the same portion as the third embodiment, the explanation will be omitted. In this embodiment, the optical system of the third embodiment is partially modified so that the interfered light for incremental measurement, absolute code pattern and home position code pattern are projected on the photoelectric element array SARY by the image projecting lens LNS2 through the beam splitter BS. Thus, the arrangement of the photoreceptor array SARY is the reverse of that of the third embodiment. By such a structure, the edge resolution of the absolute pattern and home position pattern is improved, resulting in further detecting accuracy.

Figure 11:
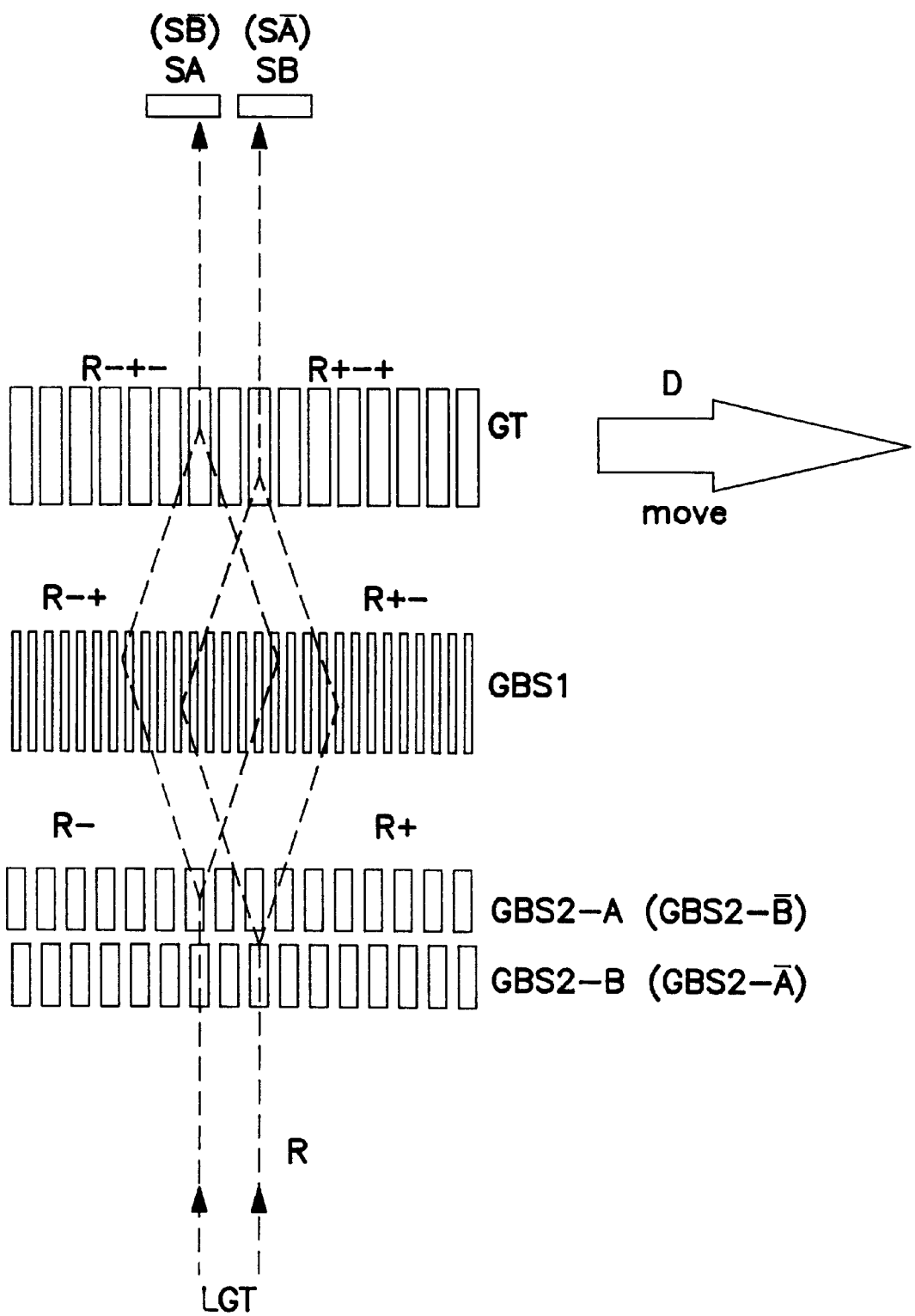
FIG. 11 is a schematic diagram illustrating light paths in the rotary encoder in the fifth embodiment of the present invention.
Figure 12:
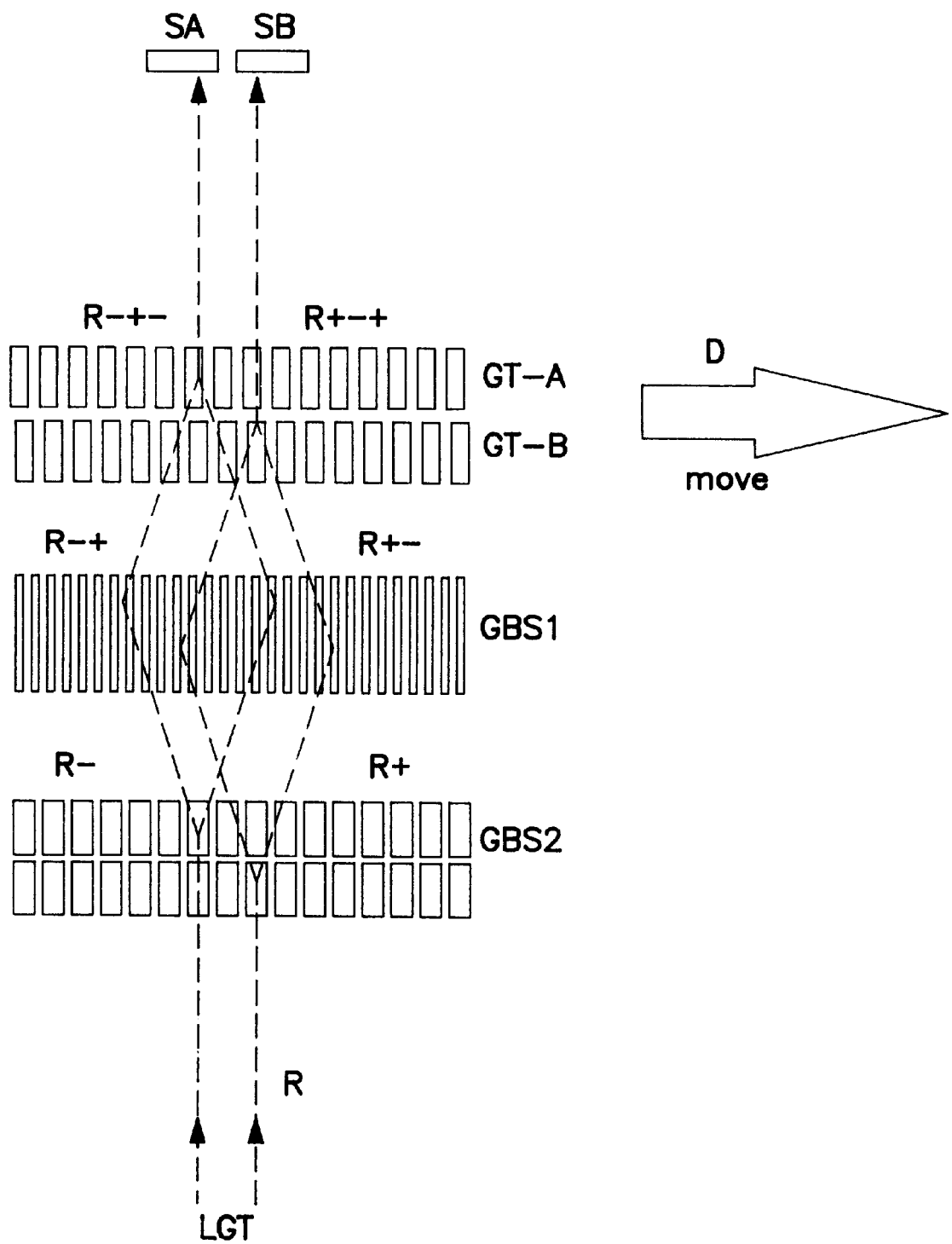
FIG. 12 is a schematic diagram illustrating light paths in the rotary encoder in a sixth embodiment of the present invention.
Figure 13:
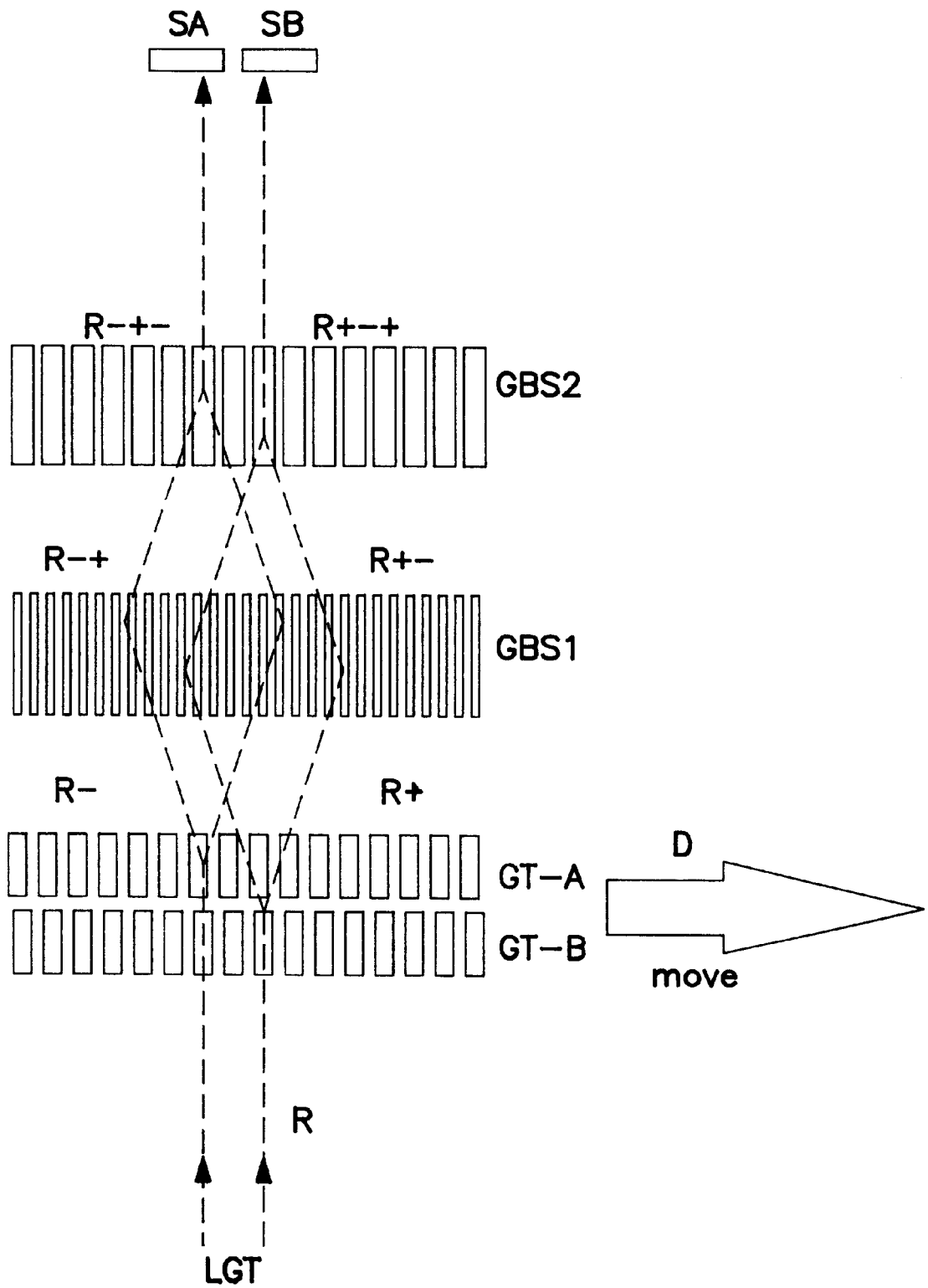
FIG. 13 is a schematic diagram illustrating light paths in the rotary encoder in a seventh embodiment of the present invention.

FIGS. 11 through 13 are schematic diagrams illustrating light paths in the rotary encoders in the fifth through seventh embodiments of the present invention depicted in a way similar to FIG. 3. The explanation of the same portion as the first and second embodiments will be omitted here.

Each embodiment represents modification of the first or second embodiment. Among them, in the fifth embodiment shown in FIG. 11, the positions of the disk D having the radial grating GT and the second diffraction grating GBS2 are reversed. Two ± first order diffraction light beams R+ and R− are formed from each region in the second diffraction gratings GBS2 divided into four sections, GBS2-A, GBS2-B, GBS2-A and GBS2-B, the light beams R+− and R−+ are formed by the reflection of the ± first order diffraction light beams R+ and R− with the first diffraction grating GBS1, and finally the light beams R+−+ and R−+− are formed by reflecting with the radial grating at the crossing point.

Next, in the sixth embodiment shown in FIG. 12, the second diffraction grating GBS2 is not divided differing from the fifth embodiment, but the radial grating GT is divided into two regions, GT-A and GT-B, in the radial direction, of which the phase is shifted by one-fourth period from each other. In this case, the detector consists of only the photoelectric elements SA and SB in response to these two regions.

Moreover, in the seventh embodiment in shown FIG. 13, the arrangements of the disk D having a radial grating GT and the second diffraction grating GBS2 are reversed similar to the first and second embodiments.

In either case among these embodiments, the diffraction grating GT and the first and second diffraction grating GBS1 and GBS2, for detecting the amount of the incremental rotation by the grating interference/diffraction method, and the patterns for detecting other rotational information, such as absolute rotating position and home position, by the detection of the transmittance/non-transmittance of the light differing from the grating interference method, are illuminated with the single illuminating optical system together. Thus, a compact, simple structure can be achieved, resulting in a further miniaturized apparatus.

Figure 14:
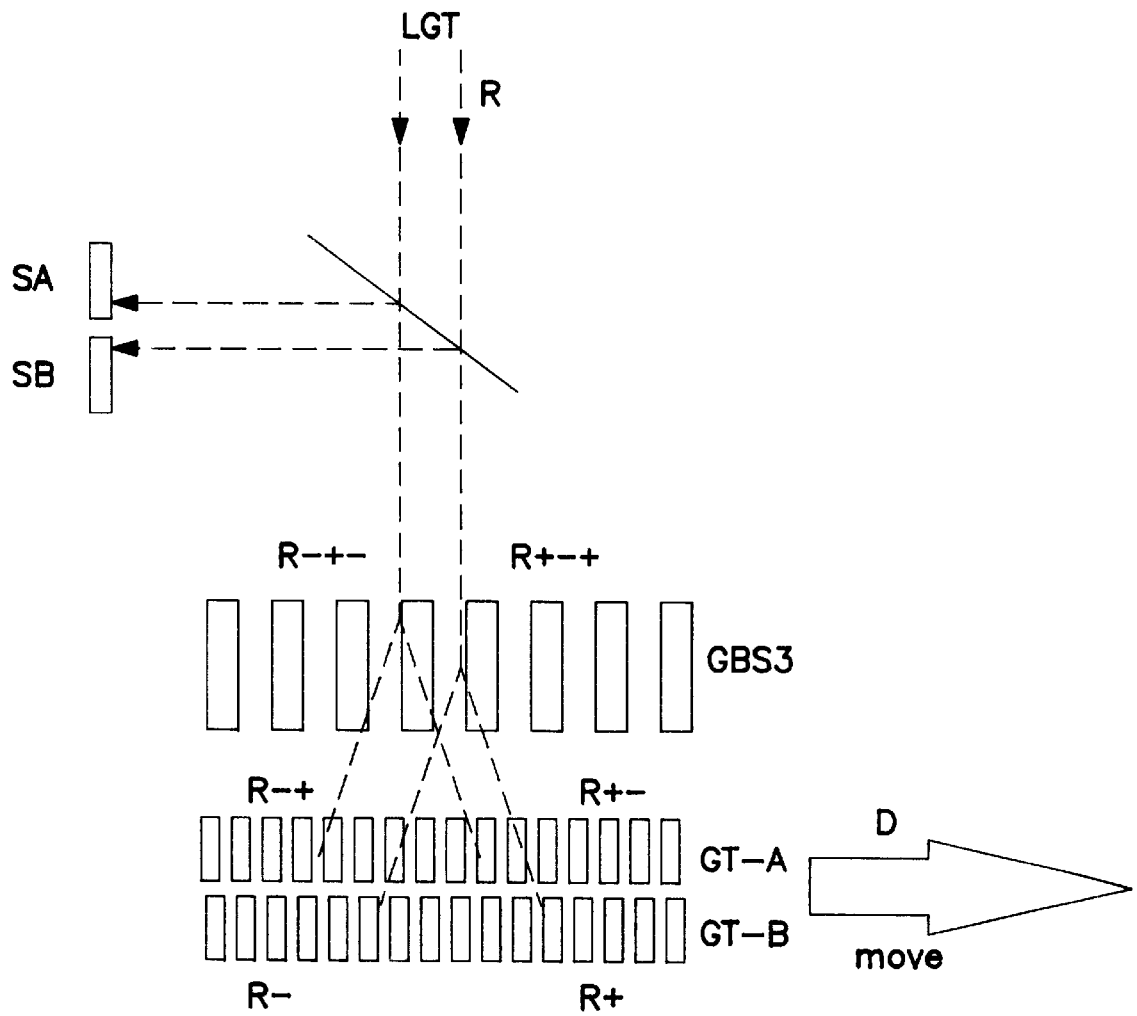
FIG. 14 is a schematic diagram illustrating light paths in the rotary encoder in a eighth embodiment of the present invention.

FIG. 14 is a schematic diagram illustrating light paths in the rotary encoder in the eighth embodiment of the present invention, depicted in a way similar to FIG. 8. The explanation on the same structure as the third and fourth embodiments will be omitted. This embodiment is a modification of the third or fourth embodiment. In this embodiment, the diffraction grating GBS3 is not divided, thereby differing from the third or fourth embodiment, but in contrast, the radial grating GT is divided into two regions, GT-A and GT-B, provided in the radial direction so that the phases of two regions are relatively shifted to one-fourth period. In this case, the photoelectric element array consists of only photoelectric elements SA and SB.

Figure 15:
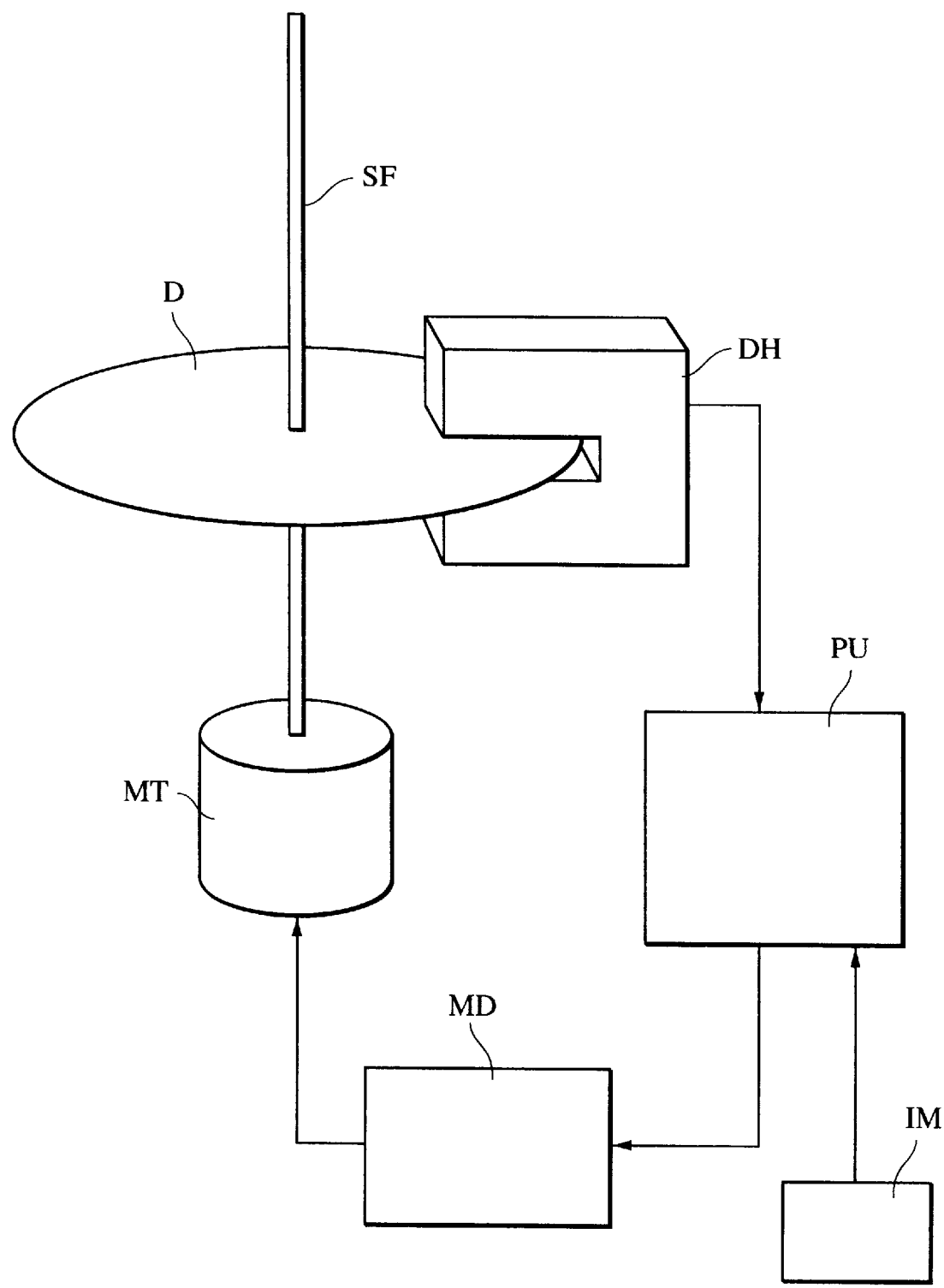
FIG. 15 is a outlined block diagram illustrating a motor driver system in a ninth embodiment of the present invention.

FIG. 15 is a outlined block diagram illustrating a motor driver system in the ninth embodiment of the present invention, wherein DH represents a detecting head including all parts of the optical system from the light source LGT to the photoelectric element array SARY in any of the first through eighth embodiments, but does not include disk D which is shown separately, PU represents a signal processing circuit which measures the amount and direction of the incremental rotation, and the position of the discrete rotation, detects the home position, and generates control signals by processing the signal from each photoreceptor in the photoelectric element array SARY, IM represents an input section to input the command of the rotation to the signal processing circuit PU, MD represents a motor driver for controlling the drive of the motor in response to the control signals from the signal processing circuit PU, MT represents a motor, and SF represents a shaft driven by the motor and transmits the driving power to each driven portion not shown in FIG. 15.

The signal processing circuit PU generates control signals based on the output from each photoelectric element in the photoelectric element array SARY and input command information from the input section. The drive of the shaft SF is controlled by the motor MT receiving the control signals. By such a structure, the detecting head HD is miniaturized and a more compact motor driver system can be achieved.

Further, the optical system can be developed by the following alterations:

(1) In the optical path for division, deflection and synthesis of the light beam by three diffraction gratings, numbers N1, N2 and N3 per circuit of the first, second and third radial diffraction gratings may be modified within the range satisfying the following relation:

$$n1 \cdot N1 + n2 \cdot N2 + n3 \cdot N3 = 0$$

wherein n1, n2 and n3 represent the diffraction orders by the first, second and third diffraction gratings, respectively. Therefore, the number, N, of radial diffraction gratings, not provided on the disk D and thus not requiring the recording on the entire circuit, is not always an integer, but may be a real number. In the first embodiment, n1=+1, n2=−1, n3=+1, N1=2,500, N2=5,000, and N3=2,500.

(2) The absolute code pattern U, V and W may be modified for a common pure binary code, grey code or the like, not for the motor control.

(3) The division number and phase difference amount of the phase difference signal generating diffraction grating (GBS2 in FIG. 1) for the measurement of the incremental amount of the rotation may be changed. For example, by setting the dividing number to two, the phases of interfered signals generated are shifted by 90 degree each other, or by setting the dividing number to six, the phases are shifted by 60 degree each other.

(4) The home position detecting method may be changed to a method for detecting the peak of the correlation function by overlapping two random pitch patterns, not the aforementioned method in which the detecting pattern is obtained from the differential signal of two signals shifted in the rotation direction.

While the present invention has been described with reference to what are presently considered to be the preferred embodiments, it is to be understood that the invention is not limited to the disclosed embodiments. To the contrary, the invention is intended to cover various modifications and equivalent arrangements, included within the spirit and scope of the appended claims. The scope of the following claims is to be accorded the broadest interpretation so as to encompass all such modifications and equivalent structures and functions.

What is claimed is:

1. An apparatus for detecting information on relative rotation of an object having a first diffraction grating and a predetermined data recording section, comprising:

first detecting means for detecting by interfering diffracted light from the first diffraction grating to detect relative rotation information of said object relative to the apparatus;

second detecting means for detecting light from the predetermined data recording section from the object to detect rotation information regarding the object other than said relative rotation information; and light beam illuminating means for illuminating the first diffraction grating and the predetermined data recording section together by one light beam from one light source.

2. An apparatus according to claim 1, wherein said first detecting means has at least one diffraction grating other than the first diffraction grating, provided at a position before the light enters the first diffraction grating or after the light is emitted from the first diffraction grating.

3. An apparatus for detecting information on relative rotation of an object having a first diffraction grating and a predetermined data recording section, comprising:

first detecting means for detecting by interfering diffracted light from the first diffraction grating to detect relative rotation information of said object relative to the apparatus, said first detecting means having at least one diffraction grating other than the first diffraction grating, provided at a position before the light enters the first diffraction grating or after the light is emitted from the first diffraction grating;

second detecting means for detecting light from the predetermined data recording section from the object to detect rotation information regarding the object other than said relative rotation information; and light beam illuminating means for illuminating the first diffraction grating and the predetermined data recording section together by one light beam, wherein said at least one diffraction grating other than the first diffraction grating comprises two to four grating portions wherein the phase of each of said grating portions is shifted relative to each of the other grating portions.

4. An apparatus according to claim 1, wherein said second detecting means detects light from the predetermined data recording section without interference.

5. An apparatus according to claim 1, wherein said second detecting means detects information regarding transmittance/non-transmittance of the light at the predetermined data recording section.

6. An apparatus according to claim 1, wherein said second detecting means detects information on an amount of the transmitted light from the predetermined data recording section.

7. An apparatus according to claim 1, wherein said first detecting means and said second detecting means have a common photo-receiving system for receiving the light from the first diffraction grating and the light from the predetermined data recording section together on respective photoelectric converting means provided on said photo-receiving system.

8. An apparatus according to claim 1, wherein said second detecting means detects light from absolute code pattern in the predetermined data recording section.

9. An apparatus according to claim 1, wherein said second detecting means detects the light from a home position detecting pattern in the predetermined data recording section.

10. An apparatus for detecting information on relative rotation of an object having a first diffraction grating and predetermined data recording section, comprising:

first photoelectric converting means for receiving interfered and diffracted light from the first diffraction grating to obtain incremental rotation information regarding the object from an output from said first photoelectric converting means;

second photoelectric converting means for detecting information on transmittance/non-transmittance of the light by said predetermined data recording section to obtain rotation information regarding the object, other than the incremental rotation information from the output from said first photoelectric converting means; and illuminating means for illuminating the diffraction grating and the predetermined data recording section together by one light beam from one light source.

11. An apparatus according to claim 10, wherein said apparatus further comprises at least one diffraction grating, other than the first diffraction grating, provided in a light path with said diffraction grating.

12. An apparatus for detecting information on relative rotation of an object having a first diffraction grating and a predetermined data recording section, comprising:

first photoelectric converting means for receiving interfered and diffracted light from the first diffraction grating to obtain incremental rotation information regarding the object from an output from said first photoelectric converting means;

second photoelectric converting means for detecting information on transmittance/non-transmittance of the light by said predetermined data recording section to obtain rotation information regarding the object, other than the incremental rotation information from the output from said first photoelectric converting means; and illuminating means for illuminating the diffraction grating and the predetermined data recording section together;

at least one diffraction grating, other than the first diffraction grating provided in a light path with said diffraction grating and wherein said at least one diffraction grating other than the first diffraction grating comprises two to four partial gratings, each of said partial gratings having a phase different from each other.

13. An apparatus according to claim 10, wherein said apparatus further comprises a common photo-receiving system for receiving the light from the first diffraction grating and the light from the predetermined data recording section to said first and second photoelectric converting means.

14. An apparatus according to claim 10, wherein said second photoelectric converting means receives light from an absolute code pattern as the predetermined data recording section.

15. An apparatus according to claim 10, wherein said second photoelectric converting means receives light from home position detecting pattern as the predetermined data recording section.

16. An apparatus according to claim 10, wherein said illuminating system has a light source and a collimator lens.

17. An apparatus for controlling relative rotation of two objects comprising:

a scale section provided on one of the two objects, said scale section having a diffraction grating and a predetermined data recording section;

a detecting unit provided on the other of the two objects, said detecting unit comprising:
  i) a first photoelectric converting section for receiving the interfered and diffracted light from said diffraction grating, to obtain incremental rotation information regarding the one of the two objects by an output from said first photoelectric converting section,
  ii) a second photoelectric converting section for detecting transmittance/non-transmittance of the light from said predetermined data recording section, to obtain rotation information regarding the one of the two objects, other than the incremental rotation information, by the output from said second photoelectric converting section, and
  iii) an illuminating system for illuminating said diffraction pattern and said predetermined data recording section together by one light beam from one light source; and a control system for controlling relative rotation of the two objects based on the outputs from said first and second photoelectric converting sections.

18. An apparatus for detecting information on relative rotation of an object having a diffraction grating and a predetermined data recording section, said apparatus comprising:

first detecting means for detecting by making the diffracted light from said diffraction grating interfere to detect incremental rotation information regarding said object;

second detecting means for detecting light from the predetermined data recording section of the object to detect rotation information regarding the object; and illuminating means for illuminating the diffraction grating and the predetermined data recording section together by one beam from one light source;

common light guiding means for introducing light emitted from the diffraction grating and the predetermined data recording section together to said first and second detecting means.

19. An apparatus for detecting information on relative rotation of an object having a diffraction grating and a predetermined data recording section, said apparatus comprising:

a first photoelectric converting section for receiving the interfered and diffracted light from said diffraction grating to obtain incremental rotation information regarding said object by an output from said first photoelectric converting section;

a second photoelectric converting section for detecting transmittance/non-transmittance information by the predetermined data recording section to obtain rotation information regarding the object by an output from said second photoelectric converting section, other than the incremental rotation information;

an illuminating system for illuminating the diffraction grating and the predetermined data recording section together by one beam from one light source; and a common optical member for introducing light emitted from the diffraction grating and the predetermined data recording section together to said first and second photoelectric converting sections.

20. An apparatus according to claim 1, wherein said second detecting means detects information regarding reflection/non-reflection of the light at the predetermined data recording section.

21. An apparatus according to claim 1, wherein said second detecting means detects information on an amount of the reflected light from the predetermined data recording section.

22. An apparatus for detecting information on relative rotation of an object having a first diffraction grating and a predetermined data recording section, comprising:

first photoelectric converting means for receiving interfered and diffracted light from the first diffraction grating to obtain incremental rotation information regarding the object from an output from said photoelectric converting means;

second photoelectric converting means for detecting information on reflection/non-reflection of the light by said predetermined data recording section to obtain rotation information regarding the object, other than the incremental rotation information from the output from said first photoelectric converting means; and illuminating means for illuminating the diffraction grating and the predetermined data recording section together by one light beam from one light source.

23. An apparatus for controlling relative rotation of two objects comprising:

a scale section provided on one of the two objects, said scale section having a diffraction grating and a predetermined data recording section;

a detecting unit provided on the other of the two objects, said detecting unit comprising:
  i) a first photoelectric converting section for receiving the interfered and diffracted light from said diffraction grating, to obtain incremental rotation information regarding the one of the two objects by an output from said first photoelectric converting section,
  ii) a second photoelectric converting section for detecting reflection/non-reflection of the light from said predetermined data recording section, to obtain rotation information regarding the one of the two objects, other than the incremental rotation information, by the output from said second photoelectric converting section, and iii) an illuminating system for illuminating said diffraction pattern and said predetermined data recording section together by one light beam from one light source; and a control system for controlling relative rotation of the two objects based on the outputs from said first and second photoelectric converting sections.

24. An apparatus for detecting information on relative rotation of an object having a diffraction grating and a predetermined data recording section, said apparatus comprising:

a first photoelectric converting section for receiving the interfered and diffracted light from said diffraction grating to obtain incremental rotation information regarding said object by an output from said first photoelectric converting section;

a second photoelectric converting section for detecting reflection/non-reflection information by the predetermined data recording section to obtain rotation information regarding the object by an output from said second photoelectric converting section, other than the incremental rotation information;

illuminating means for illuminating the diffraction grating and the predetermined data recording section together by one beam from one light source; and a common optical member for introducing light emitted from the diffraction grating and the predetermined data recording section together to said first and second photoelectric converting sections.

* * * * *

UNITED STATES PATENT AND TRADEMARK OFFICE
CERTIFICATE OF CORRECTION

PATENT NO. : 5,917,182

DATED : June 29, 1999

INVENTOR(S): KOU ISHIZUKA

It is certified that error appears in the above-identified patent and that said Letters Patent is hereby corrected as shown below:

COLUMN 4,
Line 14, "a eighth" should read --an eighth--; and
Line 16, "a outlined" should read --an outlined--.

COLUMN 5,
Line 3, R+-+ and R-+-," should read --R+ - + and R - + - --,.

COLUMN 6,
Line 28, delete "of";
Line 29, "beam," should read --beams--; and
Line 34, "a absolute" should read --an absolute--;

COLUMN 7,
Line 14, "a image" should read --an image--.

COLUMN 8,
Line 52, "other," should read --other;--; and
Line 61, "reflected" should read --is reflected--.

COLUMN 9,
Line 2, "is" should read --are--.

UNITED STATES PATENT AND TRADEMARK OFFICE
CERTIFICATE OF CORRECTION

PATENT NO. : 5,917,182

DATED : June 29, 1999

INVENTOR(S): KOU ISHIZUKA

It is certified that error appears in the above-identified patent and that said Letters Patent is hereby corrected as shown below:

COLUMN 10,
Line 29, "a outlined" should read --an outlined--.

COLUMN 11,
Line 12, "degree each" should read --degrees of each--; and
Line 14, "degree each" should read --degrees of each--.

Signed and Sealed this

Eighth Day of February, 2000

Attest:

Q. TODD DICKINSON

Attesting Officer    Commissioner of Patents and Trademarks